US008222895B2

(12) United States Patent
Asahara et al.

(10) Patent No.: US 8,222,895 B2
(45) Date of Patent: Jul. 17, 2012

(54) DISPLACEMENT SENSING DEVICE

(75) Inventors: Norimi Asahara, Numadu (JP); Yukiko Nishida, Osaka (JP); Masahisa Niwa, Suita (JP)

(73) Assignees: Toyota Jidosha Kabushiki Kaisha, Toyota-shi (JP); Panasonic Corporation, Kadoma-shi (JP)

( * ) Notice: Subject to any disclaimer, the term of this patent is extended or adjusted under 35 U.S.C. 154(b) by 214 days.

(21) Appl. No.: 12/523,214

(22) PCT Filed: Jan. 11, 2008

(86) PCT No.: PCT/JP2008/050652
§ 371 (c)(1),
(2), (4) Date: Jul. 15, 2009

(87) PCT Pub. No.: WO2008/088055
PCT Pub. Date: Jul. 24, 2008

(65) Prior Publication Data
US 2010/0117630 A1    May 13, 2010

(30) Foreign Application Priority Data

Jan. 15, 2007   (JP) ................................ 2007-006118
Jan. 15, 2007   (JP) ................................ 2007-006119

(51) Int. Cl.
*G01B 7/30* (2006.01)
(52) U.S. Cl. ......... 324/207.25; 324/207.11; 324/207.12; 324/207.13; 324/207.14; 324/207.15; 324/207.2; 324/207.21; 324/207.22; 324/207.23; 324/207.24
(58) Field of Classification Search ............ 324/207.11–207.15, 207.2, 207.21–207.25
See application file for complete search history.

(56) References Cited

U.S. PATENT DOCUMENTS 6,057,682 A * 5/2000 McCurley et al. ....... 324/207.23
6,411,082 B2 * 6/2002 Glasson .................... 324/207.25
(Continued)

FOREIGN PATENT DOCUMENTS
JP            2-30895           2/1990
(Continued)

OTHER PUBLICATIONS
Japanese Office Action issued Nov. 9, 2010, in Patent Application No. 2007-006118.

*Primary Examiner* — Huy Q Phan
*Assistant Examiner* — Son Le
(74) *Attorney, Agent, or Firm* — Oblon, Spivak, McClelland, Maier & Neustadt, L.L.P.

(57) ABSTRACT

A compact sensing device capable of sensing a rotational angle and a rotational velocity, or a rectilinear moving distance and a moving velocity. A displacement sensing device that senses a rotational angle of a moving member rotation and a distance of a linear movement of the moving member, or senses an angular velocity of the moving member rotation and a velocity of a linear movement of the moving member, includes: a first movable member, moved together with the moving member by a linear movement of the moving member; a second movable member holding the first movable member in a rotatable manner, and rotated together with the moving member by rotation of the moving member; a first sensor outputting a signal in accordance with a linear movement of the first movable member; and a second sensor outputting a signal in accordance with a rotation of the second movable member.

11 Claims, 3 Drawing Sheets

U.S. PATENT DOCUMENTS

| | | | |
|---|---|---|---|
| 6,812,693 B2 | 11/2004 | Heinrich et al. | |
| 2001/0016535 A1* | 8/2001 | Itoh et al. | 476/46 |
| 2008/0079423 A1* | 4/2008 | Wolf | 324/207.25 |

FOREIGN PATENT DOCUMENTS

| | | |
|---|---|---|
| JP | 6 56714 | 8/1994 |
| JP | 7 208905 | 8/1995 |
| JP | 7 317867 | 12/1995 |
| JP | 8-50017 | 2/1996 |
| JP | 10 47912 | 2/1998 |
| JP | 2002 195393 | 7/2002 |
| JP | 2003 83764 | 3/2003 |
| JP | 2003 202239 | 7/2003 |

* cited by examiner (a)

(b)

DISPLACEMENT SENSING DEVICE

TECHNICAL FIELD

This invention relates to a device for sensing a movement such as a linear movement and a rotational movement, and more specifically, to a device for detecting an amount of displacement or a displacement rate. For example, the device of the present invention can be used for detecting a rotational angle and a rotational speed as well as an anteroposterior moving distance and a moving speed of a trunnion of a toroidal type transmission.

BACKGROUND ART

Position sensors having a permanent magnet and a hall element sensitive to magnetism for outputting signals are widely known in the art. However, linearity of an output of the position sensor of this kind with respect to displacement is basically insufficient, and the position sensors of this kind are generally expensive. Therefore, an application of the position sensors of this kind has to be restricted. In order to solve the above-mentioned problems, Japanese Patent Laid-Open No. 2003-83764 discloses a position sensor comprising a hollow detection coil to which constant current of a prescribed frequency and amplitude is applied, and a metal body inserted into the detection coil. According to the teachings of Japanese Patent Laid-Open No. 2003-83764, a change in impedance according to insertion amount of the metal body is detected by detecting voltage at both ends of the detection coil, and the detected voltage is converted into a position signal representing positional information. Therefore, the position sensor taught by Japanese Patent Laid-Open No. 2003-83764 is capable of detecting an amount of displacement of the metal body and a velocity of the displacement on the basis of the detected voltage. In addition, Japanese Patent Laid-Open No. 2003-83764 discloses different kinds of examples such as an example in which the detection coil and the metal body are formed linearly, and an example in which the detection coil and the metal body are curved with a predetermined curvature. According to the latter example, the curved metal body is rotated around a center of curvature by stepping an accelerator pedal thereby varying an insertion amount of the metal body in the curved detection coil.

As described, a trunnion of a toroidal type transmission is a well known member performing a translational motion. In this connection, Japanese Patent Laid-Open No. 07-317867 discloses a device, which is adapted to detect an rotation angle and a displacement amount of a trunnion by a sensor through a movement of a precess cam. According to the teachings of Japanese Patent Laid-Open No. 07-317867, specifically, the sensor is contacted with a spiral cam face of the precess cam to detect a synthesized value of the rotation angle and a displacement of the trunnion, for the purpose of controlling a speed change ratio.

On the other hand, Japanese Patent Laid-Open No. 2002-195393 discloses a device comprising two kinds of sensors such as a sensor for detecting an oscillation angle of the trunnion and a sensor for detecting an amount of displacement of the trunnion. That is, Japanese Patent Laid-Open No. 2002-195393 discloses an invention for controlling a speed change ratio of a toroidal type continuously variable transmission by detecting an amount of displacement and a (tilted) rotational angle of the trunnion. According to the teachings of Japanese Patent Laid-Open No. 2002-195393, a contact sensor as well as a noncontact type sensor including a capacitance sensor and an optical sensor can be used to detect the aforementioned amount of displacement and the rotational angle.

The position sensor taught by Japanese Patent Laid-Open No. 2003-83764 is capable of detecting a position of a member moving linearly and a movement of a member rotating around a predetermined fulcrum point such as an accelerator pedal, by detecting a migration of the metal body with respect to the detection coil, that is, by detecting a change in the impedance. However, in order to detect a translational movement of a member, two position sensors are required to detect a rotation and a linear movement of the member. Therefore, comparatively large space is required for arranging two sensors on the member performing the translational movement and this restricts an application thereof. For example, in case the toroidal type continuously variable transmission, a space around the trunnion thereof is limited, and a plurality of power rollers and trunnons supporting the power rollers are arranged on one variator (or a cavity). Therefore, a number of position sensors are required for detecting an amount of displacement and a tilted rotational angle of the trunnion. Thus, it is difficult to use the position sensor taught by Japanese Patent Laid-Open No. 2003-83764 in the toroidal type continuously variable transmission.

In addition to the above-mentioned disadvantage, according to the position sensor taught by Japanese Patent Laid-Open No. 2003-83764, the metal body moving within the detection coil has to be connected with an object to be detected. Thus, the position sensor of Japanese Patent Laid-Open No. 2003-83764 is not easy to be assembled. Moreover, in case the object to be detected is a member performing a complex movement while rotating such as the trunnion, detection accuracy may be degraded by such complex movement of a portion to be detected. Therefore, it is necessary to further analyze a detection result.

As described, the device taught by Japanese Patent Laid-Open No. 07-317867 requires the precess cam. This means that the device taught by Japanese Patent Laid-Open No. 07-317867 cannot be applied to an apparatus which is not provided with the precess cam. Moreover, according to the device taught by Japanese Patent Laid-Open No. 07-317867, a load is applied to one sensor in a rotational direction as well as in an axial direction. For this reason, detection accuracy may be degraded by a frictional resistance at a contact portion.

As also described, the device taught by Japanese Patent Laid-Open No. 2002-195393 requires both of the sensor for detecting rotation and the sensor for detecting a linear displacement. That is, the device taught by Japanese Patent Laid-Open No. 2002-195393 also contains the aforementioned disadvantage of the position sensor taught by Japanese Patent Laid-Open No. 2003-83764.

In addition, the noncontact type sensor as disclosed in Japanese Patent Laid-Open No. 2002-195393 is adapted to detect a displacement by detecting a change in a capacitance or a laser light in response to a migration of a portion of the trunnion or a migration of a member to be detected arranged on the trunnion. That is, it is necessary for the object such as the trunnion to be provided with a member to be detected. For this purpose, the member to be detected has to be arranged on a moving portion side, and the sensor has to be arranged on a fixed portion side. Thus, the device of Japanese Patent Laid-Open No. 2002-195393 cannot be assembled easily, and therefore an easiness of assembly has to be improved. On the other hand, in case of using the contact sensor, the contact sensor has to be connected with an object to be detected. That is, the contact sensor also has to be connected with both moving portion and the fixed portion. Thus, an easiness of assembly also has to be improved even in case of using the contact sensor. In this case, especially, if the object to be detected is a member performing a complex movement while rotating such as the trunnion, detection accuracy may be degraded by such complex movement of the portion to be detected. Therefore, it is necessary to further analyze a detection result.

DISCLOSURE OF THE INVENTION

The present invention has been conceived noting the technical problems thus far described, and its object is to provide a compact displacement sensing device capable of sensing a rotational angle and a rotational velocity, as well as a rectilinear moving distance and a moving velocity.

Another object of the present invention is to provide a displacement sensing device, which can be assembled easily, and which is capable of sensing a displacement of an object to be sensed accurately even if the object moves three-dimensionally.

In order to achieve the above-mentioned object, according to the present invention, there is provided a displacement sensing device for sensing a rotational angle of a rotation of a moving member and a distance of a linear movement of the moving member, or sensing an angular velocity of a rotation of the moving member and a velocity of a linear movement of the moving member, characterized by comprising: a first movable member, which is moved together with the moving member by a linear movement of the moving member; a second movable member, which is held by the first movable member in a rotatable manner or which holds the first movable member in a rotatable manner, and which is rotated together with the moving member by a rotation of the moving member; a first sensor outputting a signal in accordance with a linear movement of the first movable member; and a second sensor outputting a signal in accordance with a with a rotation of the second movable member.

The first movable member may be engaged with the moving member to be integrated with the moving member only in a direction of the linear movement. On the other hand, the second movable member may be engaged with the moving member to be integrated with the moving member only in the rotational direction.

The second movable member is formed cylindrically and held in a casing in a rotatable manner, and the first movable member may be held in the cylindrical second movable member in a manner to move linearly.

In this case, the second sensor is arranged in the casing, and the first sensor is arranged in the cylindrical second movable member.

In addition to above, at least one of the first and the second sensors comprises: a detection coil; and a metal member, which is arranged in close proximity to the detection coil in a manner to move relative to the detection coil to vary impedance of the detection coil. Said one of the first and the second sensors includes a detecting device for detecting the distance or velocity of the linear movement of the moving member, or the amount or the angular velocity of the rotation of the moving member by an electric signal according to a change in the impedance.

On the other hand, the moving member includes a trunnion holding a power roller of a toroidal type continuously variable transmission, or a member integral with the trunnion.

In this case, the first movable member is pushed onto the trunnion or the member integral with the trunnion by elastic force acting in the direction of the linear movement.

In addition, according to the present invention, the second movable member is pushed onto the trunnion or the member integral with the trunnion by elastic force acting in the rotational direction.

According to the present invention, therefore, the first movable member is moved linearly in case the moving member is moved linearly. In this case, the second movable member is also moved linearly provided that the first movable member is holding the second movable member in a rotatable manner. A distance of such linear movement or a moving velocity is detected by the first sensor. In case the moving member is rotated, the second movable member is rotated by the rotation of the movable member. In this case, the first movable member is also rotated provided that the second movable member is holding first the movable member in a rotatable manner. A rotational angle or an angular velocity is detected by the second sensor. Thus, both of the first and the second movable members are communicated with the moving member, and the first and the second movable members are provided individually with the first and the second sensor. Therefore, the rotational angle and the angular velocity, as well as the distance and the velocity of the linear movement of the moving member can be detected. That is, the rotation and the linear movement can be detected by one device. For this reason, a required installation space can be minimized. Moreover, only one portion or substantially one portion of the moving member is detected directly. Therefore, the translational movement of the moving member, that is, the rotational amount and the rotational speed of the moving member, as well as the moving distance and the moving velocity of the linear movement of the moving member can be detected accurately.

As explained above, the second movable member is held in the casing, and the first movable member is held by the second movable member. Thus, according to the present invention, those movable members are unitized so that the sensing device can be downsized entirely. For this reason, the required installation space for the sensing device to detect the translational movement of the moving member including a rotation and a linear movement can be minimized.

In addition to above, the installation space for the sensing device of the present invention can be further minimized by accommodating the sensors in the casing to downsize the sensing device.

As also explained above, at least one of the sensors is adapted to detect the rotational angle, the moving distance of the linear movement and so on by detecting the change in the impedance of the coil. Therefore, the sensing device of the present invention can be downsized easily and entirely to be smaller than the conventional device using a semiconductor such as a hall element. For this reason, the sensing device of the present invention can be provided at a low cost. In addition, the member to be rotated or moved is made of metal. Therefore, a capability of the metal member to follow the moving member can be improved by lightening a weight of the metal member. For this reason, the rotational angle and the angular velocity of the moving member, as well as the moving distance and the moving velocity of the linear movement of the moving member can be detected accurately even if the moving member rotates and moves fast.

In case of applying the present invention to a toroidal type continuously variable transmission, the rotational angle and the angular velocity of the trunnion, as well as the moving distance of the trunnion in the axial direction and the moving speed thereof can be detected by one sensing device. In addition, even if all of the trunnions are provided individually with the sensing device, a number of the sensing devices will not excess a number of the trunnions. Therefore, required installation space for the sensing device of the present invention can be minimized.

As also explained above, the movable member is pushed onto the trunnion or the member integral with the trunnion by elastic force. For this reason, the sensing device of the present invention can be easily installed in the toroidal type continuously variable transmission.

According to another aspect of the present invention, there is provided a displacement sensing device for sensing a displacement of a predetermined object performing a linear movement and a rotational movement, and for outputting a detection signal, characterized by comprising: a movable member, which is contacted with the object to be moved linearly in accordance with a displacement of a contact point with the object; an elastic member for pushing the movable member onto the object by an elastic force; and a sensing member outputting a signal in accordance with a movement of the movable member.

The sensing member comprises a metal member moved integrally with the movable member, and a detection coil whose impedance is varied in accordance with a change in a relative position with respect to the metal member.

The movable member may be contacted with a face of the object perpendicular to a pushing direction of the elastic member in a slidable manner.

In addition to above, the displacement sensing device according to this example further comprises a cover member shielding a rear end portion of the movable member and the sensing member from the object, and a leading end portion of the movable member protrudes from the cover member.

According to the present invention, the object to be detected includes a trunnion of a toroidal type continuously variable transmission holding a power roller.

According to this example of the present invention, therefore, when the object to be detected moves or rotates in a predetermined direction, the movable member contacted therewith is moved linearly in accordance with a displacement of the contact point between the object and the movable member. As described above, the movable member is pushed onto the object by the elastic force, therefore, the movable member is moved in accordance with a displacement of the contact point, and the sensing member outputs a signal in accordance with the moving distance or moving velocity of the movable member. Thus, the displacement sensing device according to this example of the can be assembled easily only by pushing the movable member onto the object. As also described, the movable member is merely contacted with the object to be detected. Therefore, a direction of the displacement of the movable member is limited to the direction to elongate and compress the elastic member even if the object to be detected rotates or moves in the three-dimensional direction. For this reason, the sensing member is capable of detecting the displacement accurately.

In addition to above, according to the present invention, the metal member is moved relatively with respect to the detection coil in accordance with the displacement of the movable member, and the impedance of the detection coil is varied according to the change in a relative position with respect to the metal member. Therefore, provided that constant current of predetermined frequency is passing through the detection coil, the voltage at both ends of the detection coil is varied so that the displacement can be detected as an electric signal. Moreover, since the electric signal is an analog signal, the signal can be used as a velocity signal as it is without carrying out a signal processing, e.g., without converting a digital signal into an analog signal. For this reason, a displacement rate can be detected accurately without being affected by a noise or the like. In addition to the aforementioned advantage, the displacement sensing device of the present invention can be downsized easily.

Moreover, according to the present invention, the movable member is contacted with the face of the object perpendicular to the linear movement thereof while being allowed to slide on the face relatively with the object. Therefore, even if the object to be detected moves in a direction different from the direction of the linear movement of the movable member, the movable member will not be subjected to a displacement or a load in the direction different from that of the linear movement thereof. For this reason, the displacement sensing device of the present invention is capable of sensing a displacement accurately in the direction of the linear movement of the movable member.

Further, according to the present invention, flying dusts or lubricant resulting from an actuation of the object are blocked by the cover member. Therefore, smoothness of the movement of the movable member and a sensitivity of the sensing member can be always maintained in a preferable condition.

Furthermore, the displacement sensing device of the present invention is capable of detecting a displacement of the trunnion of the toroidal type continuously variable transmission accurately, and the displacement sensing device of the present invention can be assembled in the toroidal type continuously variable transmission easily.

BEST MODE FOR CARRYING OUT THE INVENTION

Next, this invention will be explained with its specific examples. First of all, a principle of the displacement sensing device of the present invention will be explained hereinafter. The displacement sensing device of the present invention is adapted to detect a rotational angle of a rotation of a moving member and a distance of a linear movement (or a displacement) of the moving member, or to detect an angular velocity of a rotation of the moving member and a velocity of a linear movement of the moving member. For this purpose, the displacement sensing device comprises a movable member which is rotated by a rotation of the moving member, and another movable member which is moved linearly by a linear movement of the moving member. Those movable members are individually communicated with the moving member, and one of the movable members is allowed only to rotate, and the other movable member is allowed only to move linearly. Alternatively, the movable member may also be adapted to rotate as well as move linearly by providing a separate member for allowing one of the rotation and the linear movement. An example of the former case is schematically shown in FIG. 1 (a), and an example of the latter case is schematically shown in FIG. 1 (b).

Figure 1:
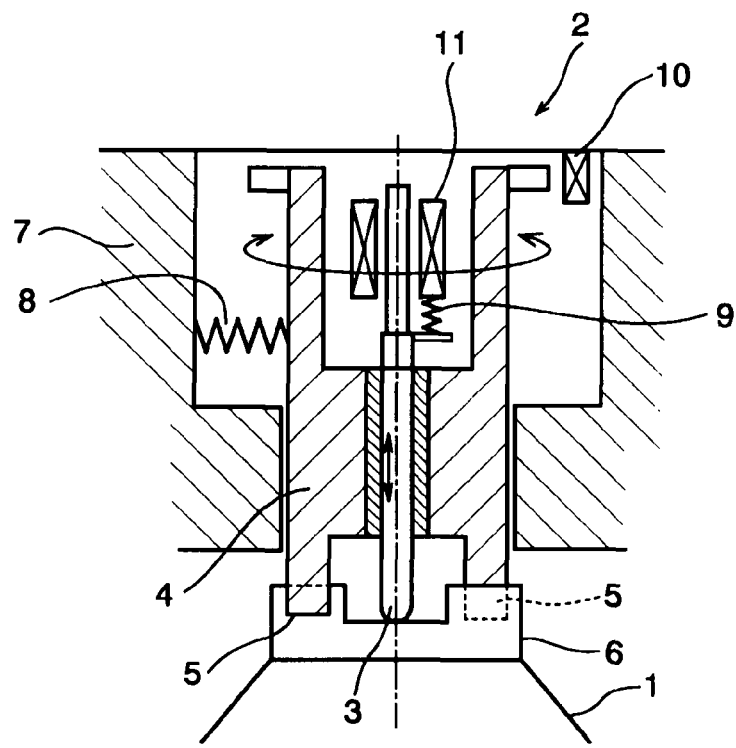
FIGS. 1 (a) and 1(b) are diagrams schematically showing a principle of the displacement sensing device of the present invention.
Figure 1:
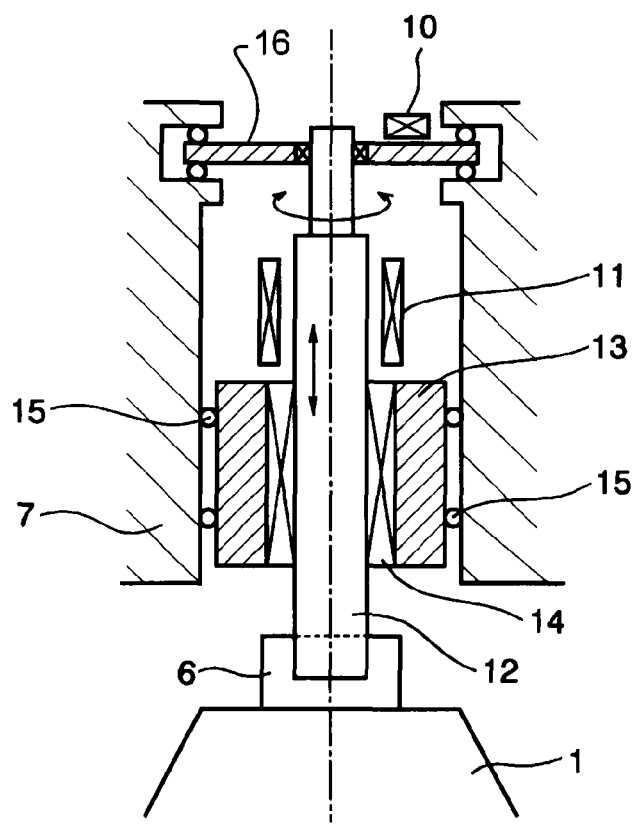

In FIG. 1, the reference numeral 1 represents the moving member such as a trunnion of a toroidal type continuously variable transmission or a member integral with the trunnion. The moving member 1 is adapted to rotate and to move linearly in an anteroposterior direction along or in parallel with a rotational center axis thereof. A sensing device 2 of the present invention is situated on an extension of the rotational center axis of the moving member 1.

The sensing device 2 shown in FIG. 1 (a) comprises a first movable member 3 which is moved linearly by a linear movement (i.e., a displacement) of the moving member 1, and a second movable member 4 rotated by a rotation of the moving member 1. The second movable member 4 is a cylindrical member having a protrusion 5 for transmitting a torque on its leading end. On the other hand, the moving member 1 comprises an engagement portion 6 protruding along the rotational center axis thereof. The engagement portion 6 comprises a protrusion the cross-section thereof is rectangular, or a groove into which the protrusion 5 is inserted to be contacted with the engagement portion 6 in the rotational direction. In order to keep the protrusion 5 being contacted with the engagement portion 6 in the rotational direction, an elastic force is applied to the second movable member 4. Specifically, a spring 8 for applying a torque to the second movable member 4 between a portion of an outer circumference of the second movable member 4 and a fixed member 7 holding the second movable member 4 in a rotatable manner.

The first movable member 3 is a shaft-like or pin shape member. The first movable member 3 protrudes the second movable member 4 while being held by the second movable member 4 in a manner to move back and forth. A leading end of the first movable member 3 is pushed onto the engagement portion 6 of the moving member 1 by an elastic force of a spring 9. Therefore, in case the moving member 1 rotates, the second movable member 4 is rotated together with the first movable member 3, and in case the moving member 1 moves linearly, the second movable member 4 is not moved but the first movable ember 3 is moved linearly.

A sensor 10 is arranged on an outer circumferential side of a rear end portion (i.e., an end portion opposite to the protrusion 5) of the second movable member 4. The sensor 10 is adapted to output a signal in accordance with a rotation of the second movable member 4. On the other hand, a sensor 11 adapted to output a signal in accordance with a linear movement of the first movable member 3 is arranged on a rear end side of the first movable member 3. A known sensor, for example, a sensor utilizing a change in impedance resulting from a relative movement between a detection coil and a metal member arranged in close proximity to the detection coil, a sensor utilizing a signal changed in accordance with a relative movement between a magnetic sensitive element and a permanent magnetic, a sensor utilizing a change in capacitance resulting from a relative movement and so on can be used as the sensors 10 and 11. The sensor 10 is positioned between the second movable member 4 and the fixed member 7, and the sensor 11 is positioned between the first movable member 3 and the second movable member 4.

According to the sensing device 2 shown in FIG. 1 (a), therefore, when the moving member 1 rotates while moving linearly, the second movable member 4 is rotated together with the moving member 1. The sensor 10 outputs a signal according to a rotational angle or a rotational angular velocity of the second movable member 4, and the rotational angle or the angular velocity thereof is detected on the basis of the outputted signal. Simultaneously, the first movable member 3 is pushed into the second movable member 4 or pushed out of the second movable member 4 depending on a direction of the linear movement of the moving member 1. The sensor 11 outputs a signal according to a moving distance or a moving velocity of the first movable member 3, so that an amount of the linear displacement of the first movable member 3 or the velocity thereof is detected on the basis of the outputted signal. Thus, an amount and a velocity of the rotation as well as a distance and a velocity of the linear movement can be detected by one sensing device 2. For this reason, the sensing device 2 according to the present invention can be used even in an apparatus in which an allowable installation space is rather small such as a toroidal type continuously variable transmission. Especially, the sensing device 2 is adapted to sense a rotation and a linear movement of a single portion, or to detect a rotation and a linear movement of the portions close proximity to each other. Therefore, the sensing device 2 according to the present invention is capable of carrying out a detection accurately without being affected by a deformation of the moving member 1 or the like.

Next, here will be explained an example shown in FIG. 1 (b). In the example shown in FIG. 1 (a), both of the movable members 3 and 4 are communicated with the moving member 1. On the other hand, according to the example shown in FIG. 1 (b), only one movable member is communicated with the moving member 1. Specifically, a detection rod 12 is provided as the movable member to be rotated and moved linearly together with the moving member 1. The detection rod 12 is a shaft-like member, and a leading end thereof is pushed onto the engagement portion 6 by an elastic force of an elastic member not shown to be engaged with the engagement portion 6 in its rotational direction.

The detection rod 12 penetrates a cylindrical holding member 13 in its axial direction while being held by a bearing 14 such as a linear slide arranged on an inner circumference of the holding member 13 in a manner to move linearly back and forth. The holding member 13 is held in a rotatable manner by a fixed member 7 through a rotational bearing 15. The detection rod 12 is thus allowed to rotate and move linearly, and therefore corresponds to both of the first and the second movable member of the present invention.

A rotating plate 16 is arranged on a rear end side of the detection rod 12 (i.e., an upper end side in FIG. 1 (b)). The rotating plate 16 is arranged perpendicular to the detection rod 12 while being held by the fixed member 7 in a rotatable manner, and the detection rod 12 penetrates a center of the rotating plate 16. Further, the rotating plate 16 is engaged with the detection rod 12 so as to rotate integrally therewith and to move relatively therewith along an axial direction of the detection rod 12. In order to output a signal in accordance with a rotational angle or an angular velocity of the rotating plate 16 rotating integrally with the detection rod 12, a sensor 10 is arranged in the vicinity of the rotating plate 16. On the other hand, in order to output a signal in accordance with a linear movement of the detection rod 12, a sensor 11 is arranged along the detection rod 12.

According to the sensing device shown in FIG. 1 (b), therefore, when the moving member 1 rotates while moving linearly, the detection rod 12 also rotates and moves linearly. As explained, the sensors 10 and 11 output the signals in accordance with the rotation and the linear movement of the detection rod 12, so that a distance of the linear displacement of the moving member 1 or the velocity thereof is detected on the basis of the outputted signals. Thus, an amount and a velocity of the rotation as well as a distance and a velocity of the linear movement can be detected by one sensing device 2. For this reason, the sensing device 2 according to the present invention can be used even in an apparatus in which an allowable installation space is rather small such as a toroidal type continuously variable transmission. Especially, the sensing device 2 is adapted to sense a rotation and a linear movement of a single portion, or to detect a rotation and a linear movement of the portions close proximity to each other. Therefore, the sensing device 2 according to the present invention is capable of carrying out a detection accurately without being affected by a deformation of the moving member 1 or the like.

Figure 2:
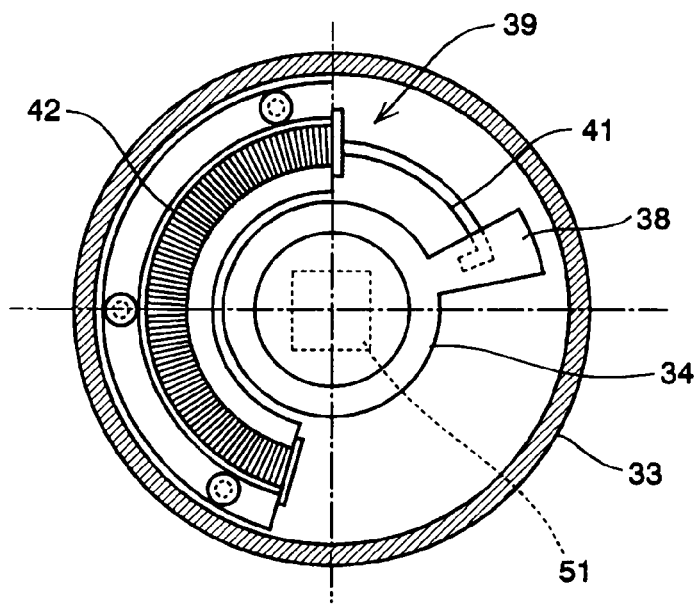
FIG. 2 is a transverse cross-sectional view showing the present invention in more details.
Figure 3:
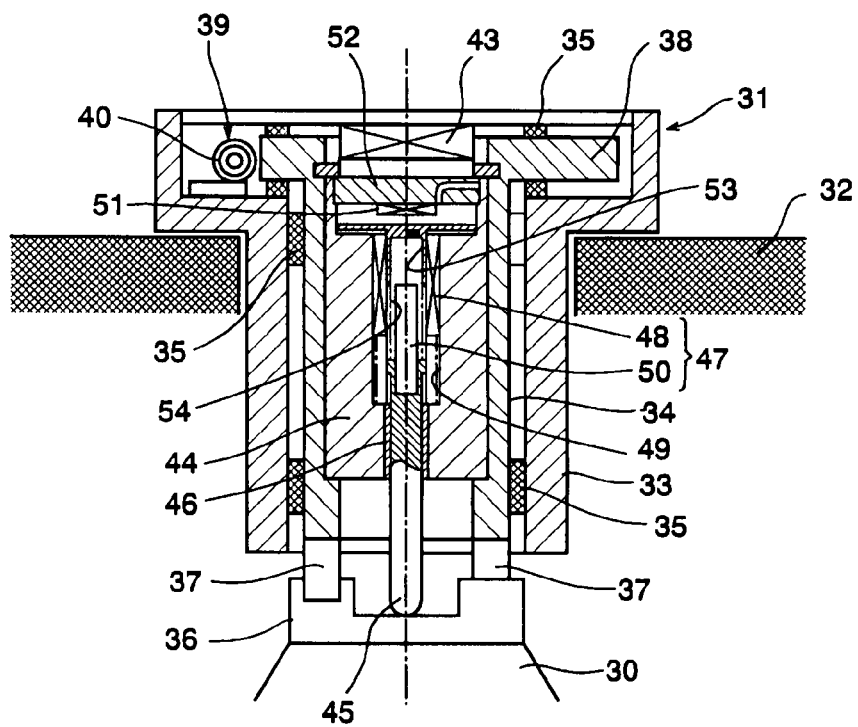
FIG. 3 is a longitudinal section view of the device shown in FIG. 2.

Here will be further explained a more specific example of the present invention. FIG. 2 is a transverse cross-sectional view showing the example of the present invention in more details, and FIG. 3 is a longitudinal section view of the example shown in FIG. 2. The example shown in those FIGS. 2 and 3 is adapted to detect a rotational angle and an angular velocity of a trunnion 30 of a toroidal type continuously variable transmission, as well as a linear displacement and a velocity of the displacement of the trunnion 30. The trunnion 30 is reciprocated by an actuator (not shown) such as a hydraulic cylinder positioned on one of the end sides thereof, and rotated in connection with such reciprocation. A sensing device 31 of the present invention is arranged on the other end side opposite to the side where the actuator is situated.

The sensing device 31 comprises a hollow casing 33 which is inserted into a transmission case 32 and fixed therewith, and a rotation body 34 is inserted into the casing 33. The rotation body 34 is entirely formed into cylindrical shape, and held rotatably by a bearing member such as a bush being interposed between an outer circumferential face thereof and an inner circumferential face of the casing 33. Therefore, the rotation body 34 corresponds to the second movable member of the present invention.

The rotation body 34 comprises an engagement portion 37 formed on its leading end (i.e., a lower end portion thereof in FIG. 2). The engagement portion 37 is adapted to be engaged with a connecting portion 36 of the trunnion 30 in its rotational direction. Specifically, the engagement portion 37 is an engagement plate or an engagement tooth to be engaged with the connecting portion 36 in the rotational direction thereof to rotate the rotation body 34 integrally with the trunnion 30. The rotation body 34 further comprises a rotation detection bracket 38 which is formed integrally on a rear end portion thereof and protruding outwardly in the radial direction. Between the rotation detection bracket 38 and the casing 33, there is arranged a rotation sensor 39 corresponding to the second sensor of the present invention.

The rotation sensor 39 is adapted to output a signal in accordance with a pivotal movement of the rotation detection bracket 38, and aforementioned kinds of conventional sensors can be used as the rotation sensor 39. In the example shown in FIGS. 2 and 3, a sensor adapted to carry out a detection utilizing a change in the impedance of the detection coil 40 is employed as the rotational sensor 39. Specifically, a detection core 41 as an arcuate metal body or a wire is attached to the rotation detection bracket 38 to extend in the rotational direction of the rotation detection bracket 38. On an extension of the detection core 41, a detection coil 40 is fixed with the casing 33. Therefore, the detection core 41 is inserted into the detection coil 40 or withdrawn from the detection core 40 according to the pivotal movement of the rotation detection bracket 38.

A constant current of a predetermined frequency and amplitude is applied to the detection coil 40. Therefore, the impedance of the detection coil 40 is varied according to an insertion length of the detection core 41 into the detection coil 40, and a voltage at both ends of the detection coil 40 is thereby varied. That is, the insertion length of the detection core 41 into the detection coil 40, in other words, a rotational angle of the rotation body 34 and a rotational angular velocity thereof can be detected on the basis of the change in the voltage of the detection coil 40. For this purpose, a signal-processing circuit 43 is attached to an inner face of a top panel of the casing 33. For example, a circuit disclosed in Japanese Patent Laid-Open No. 2003-83764 can be used as the signal-processing circuit 43. Additionally, for the purpose of keeping the engagement portion 37 being contacted with the connecting portion 36, a spring (not shown) is provided between the rotation detection bracket 38 and the casing 33 to apply an elastic force to the rotation body 34 in the rotational direction.

A cylindrical holder 44 is inserted into the rotation body 34 and engaged with the rotation body 34. The cylindrical holder 44 comprises a cylindrically-small through hole on its lower portion in FIG. 3, and a displacement detection bracket 45 corresponding to the first movable member of the present invention is inserted into the holder 44 from the through hole. The displacement detection bracket 45 is a comparatively thin shaft-like or pin-like member, and protruded downwardly in FIG. 3 to be contacted with the connecting portion 36 of the trunnion 30, likewise the rotation body 34. A leading end of the displacement detection bracket 45 is rounded to be a spherical or curved face. Therefore, a load in the radial direction such as a bending load will not be applied to the displacement detection bracket 45 even if the trunnion 30 or the connecting portion 36 rotates or moves transversely. Additionally, the displacement detection bracket 45 is held by a bearing member such as a bush 46 interposed between an outer circumferential face thereof and an inner circumferential face of the holder 44. Therefore, the displacement detection bracket 45 is allowed to reciprocate in an axial direction thereof. Further, an outer diameter of an upper end (or a rear end) portion of the displacement detection bracket 45 is larger than an inner diameter of the bush 46 so that the displacement detection bracket 45 will not be withdrawn from the bush 46.

An inner diameter of the holder 44 is enlarged above the portion where the bush 46 is fitted, and the rear end portion of the displacement detection bracket 45 is protruded therefrom. Between the rear end portion of the displacement detection bracket 45 and the holder 44, there is provided a displacement sensor 47 corresponding to the first sensor of the present invention. Likewise the aforementioned rotation sensor 39, aforementioned kinds of conventional sensors can be used as the displacement sensor 47. In the example shown in FIGS. 2 and 3, a sensor adapted to carry out a detection utilizing a change in the impedance of the detection coil 48 is employed as the displacement sensor 47.

Specifically, a magnetic shield 49 is arranged on the inner circumferential face of the hollow portion of the holder 44 in which the rear end portion of the displacement detection bracket 45 is accommodated, and a detection coil 48 is arranged on an inner circumferential side of the magnetic shield 49. A displacement detection core 50 as a metal member is attached integrally to the rear end of the displacement detection bracket 45. Therefore, the displacement detection core 50 is inserted into the detection coil 48 and withdrawn from the detection coil 48 in accordance with the axial movement of the displacement detection bracket 45. That is, the displacement detection core 50 is inserted into the detection coil 48 or withdrawn from the detection coil 48 by the displacement detection bracket 45 moved in accordance with the axial movement of the trunnion 30, and the impedance of the detection coil 48 is varied in accordance with the insertion length of the displacement detection core 50.

Likewise the aforementioned detection coil 40 for detecting rotation, a constant current of a predetermined frequency and amplitude is applied to the detection coil 48. Therefore, the impedance of the detection coil 48 is varied according to an insertion length of the displacement detection core 50 into the detection coil 40, and a voltage at both ends of the detection coil 48 is thereby varied. That is, the insertion length of the displacement detection core 50 into the detection coil 48, in other words, a displacement distance of the displacement detection bracket 45 and a velocity thereof can be detected on the basis of the change in the voltage of the detection coil 48. For this purpose, a signal-processing circuit 51 is attached to an inner face of an end plate 52 closing an opening of the holder 44 of the rear end side. For example, a circuit disclosed in Japanese Patent Laid-Open No. 2003-83764 can be used as the signal-processing circuit 51. Additionally, a spring bearing 53 is fitted into an upper end of hollow portion of the holder 44 where the detection coil 48 is situated, and a return spring 54 is arranged between the spring bearing 53 and a rear end portion of the displacement detection bracket 45. Therefore, the displacement detection bracket 45 is pushed onto the connecting portion 36 of the trunnion 30 so that the displacement detection bracket 45 is displaced in accordance with the linear movement of the trunnion 30.

Next, an action of the sensing device 31 will be explained hereinafter. As shown in FIG. 3, in case the sensing device 31 is inserted into the transmission case 32 to be attached to the toroidal type continuously variable transmission, the engagement portion 37 formed on the leading end of the rotation body 34 is engaged with the connecting portion 36 of the trunnion 30 in the rotational direction, and the displacement detection bracket 45 is pushed onto the connecting portion 36 by an elastic force. In this situation, when the trunnion 30 is moved vertically to carry out a speed change operation, the trunnion 30 is tilted (or rotated) by an action of the toroidal type continuously variable transmission.

As described, since the engagement portion 37 of the rotation body 34 is thus engaged with the connecting portion 36 of the trunnion 30 in the rotational direction, the rotation body 34 is rotated by a rotation of the trunnion 30. Therefore, the curved detection core 41 attached to the rotation body 34 is moved relatively with respect to the detection coil 40, and the insertion length of the detection core 41 into the detection coil 40 is thereby varied. As a result, the impedance and the voltage at both ends of the detection coil 40 are varied, and a signal is outputted according to the change in the impedance or the voltage at both ends of the detection coil 40. The rotational angle or the angular velocity of the trunnion 30 is detected by processing the outputted signal by the signal-processing circuit 43.

In case the trunnion 30 moves linearly in the direction of its rotational axis, the displacement detection bracket 45 is thereby displaced in its axial direction. As a result, the displacement detection core 50 is moved relatively with respect to the detection coil 48, and the insertion length of the displacement detection core 50 into the detection coil 48 is thereby varied. Therefore, as the case of detecting a rotation by the rotation sensor 39, the impedance and the voltage at both ends of the detection coil 48 are varied, and a signal is outputted according to the change in the impedance or the voltage at both ends of the detection coil 48. The displacement distance of the trunnion 30 or the velocity thereof is detected by processing the outputted signal by the signal-processing circuit 51.

Thus, the rotational angle or the angular velocity of the trunnion 30, and the moving distance or the moving speed of the trunnion 30 can be detected by one sensing device 31. Therefore, the sensing device 31 can be downsized entirely. Moreover, a required number of the sensing device for the toroidal type continuously variable transmission can be minimized so that the wiring in the toroidal type continuously variable transmission is simplified. Therefore, the toroidal type continuously variable transmission can be downsized entirely. Further, the rotation and the displacement of the trunnion 30 are detected by detecting a rotation and the displacement of substantially one portion. Therefore, the rotation and the displacement are completely synchronized in case of carrying out a feedback control of the rotation and displacement of the trunnion 30. For this reason, the feedback control can be carried out stably so that the controllability is improved. Furthermore, in case of using a sensor detecting the rotation and the linear movement by detecting a change in the voltage at both ends of the detection coils 40 and 48 resulting from a change in the impedance thereof, a detection signal to be obtained in this case is an analog signal. In this case, therefore, the angular velocity and the moving velocity can be detected accurately and easily without being affected by a noise or the like.

Here, the moving member to which the sensing device of the present invention is applied should not be limited to the trunnion of the toroidal type continuously variable transmission. That is, the sensing device of the present invention can also be applied to a member rotating and reciprocating at higher speed. In this case, the core to be moved relatively with respect to the detection coil is preferably arranged on a moving side thereby reducing inertia force to improve responsiveness and detecting accuracy.

Figure 4:
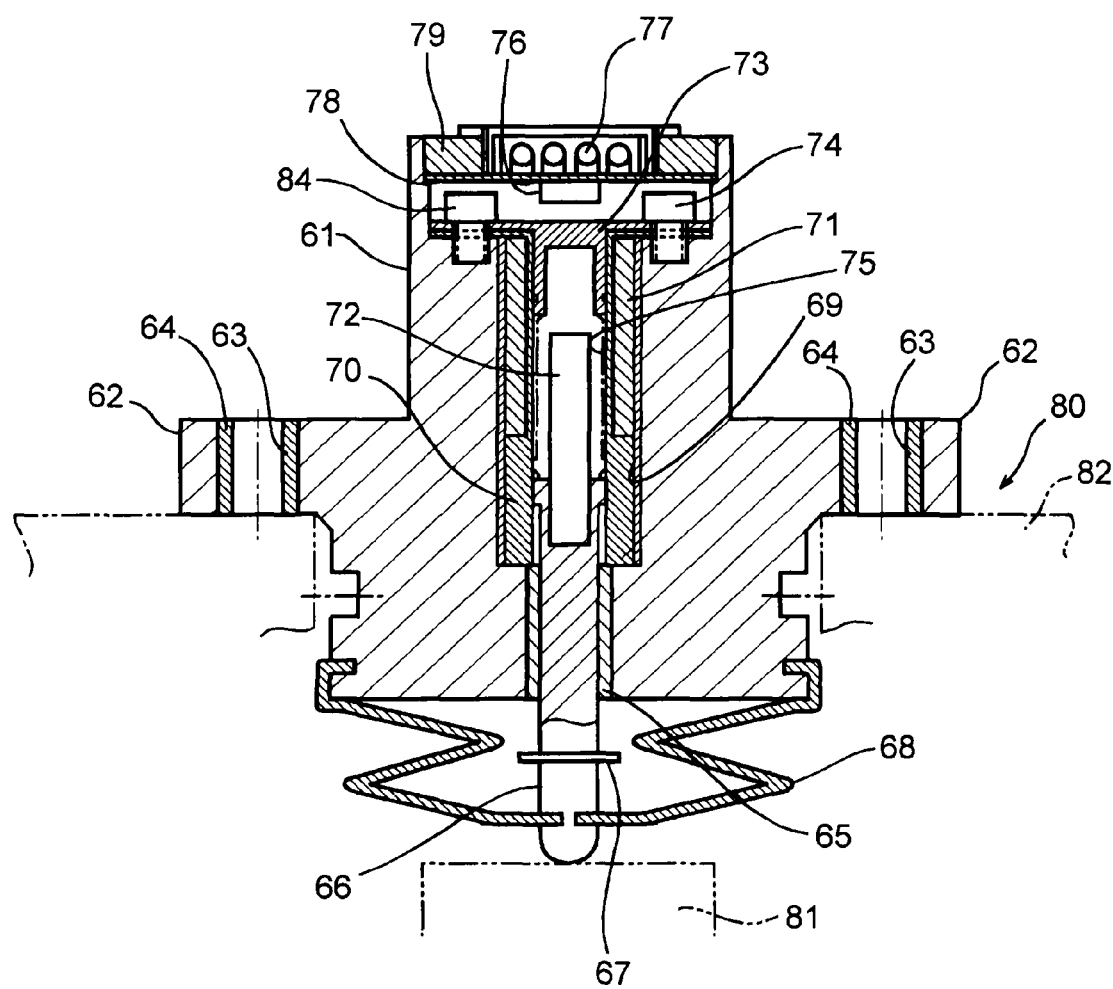
FIG. 4 is a sectional view showing one example of the displacement sensing device according to the present invention.

Here will be explained another example of the displacement sensing device of the present invention. FIG. 4 is a sectional view showing the displacement sensing device of another example. As shown in FIG. 4, the displacement sensing device comprises a body 61 as a housing. The body 61 is adapted to accommodate below-mentioned movable members and sensors, and to be attached to an apparatus having an object to be detected. In the example shown in FIG. 4, the body 61 is formed entirely into a cylindrical shape having a flange portion 62 protruding outwardly on an intermediate portion in its axial direction. The flange portion 62 comprises an installation hole 63 to be fixed with the apparatus. Here, in the example shown in FIG. 4, a collar 64 is fitted into the installation hole 63.

The body 61 comprises a cylindrically small through hole at a leading end side (i.e., a lower side in FIG. 4) and a bush 65 is fitted therein. A detection rod 66 corresponding to the movable member of the present invention is inserted into the bush 65 and held therein in a manner to move in its axial direction. Specifically, a leading end of the detection rod 66 is contacted with the object to be detected so that the detection rod 66 is moved linearly in its axial direction in accordance with a displacement of a contact point with the object. For this purpose, the leading end of the detection rod 66 is rounded into a spherical or curved face to be allowed to slide on a face of the object perpendicular to the axial direction. Additionally, in order to prevent the detection rod 66 from being pushed into the body 61 more than necessary, a retaining ring 67 such as an E-ring is fitted onto the leading end side of the detection rod 66.

A cover member 68 is attached to a leading end of the body 61. The cover member 68 is an accordion-like member made of elastic material such as rubber. As shown in FIG. 4, a base end of the cover member 68 is attached to the leading end of the body 61, and a leading end of the cover member 68 is attached to the detection rod 66 protruding therefrom. Thus, the leading end side of the body 61 is covered by the cover member 68 to be shielded from the object to be detected.

As shown in FIG. 4, a diametrically large hollow portion is formed in the body 61 above the through hole in which the bush 65 is fitted, and a magnetic shield 69 is arranged on an inner circumferential face of the hollow portion. A coil bobbin 70 is inserted into the hollow portion in an inner circumferential side of the magnetic shield 69, and an inner diameter of the coil bobbin 70 is slightly larger than that of the bush 65. A detection coil 71 is fitted on an outer circumference of the coil bobbin 70.

A rear end portion of the detection rod 66 is inserted into the coil bobbin 70, and a diameter of the rear end portion of the detection rod 66 is slightly larger than the inner diameter of the bush 65 to be contacted with an inner circumferential face of the coil bobbin 70 in a slidable manner. Therefore, the diametrically large portion of the detection rod 66 is stopped by the bush 65 so that the detection rod 66 will not come out of the body 61 toward the leading end side thereof.

A core 72 extending in the axial direction of the detection rod 66 is attached integrally to the rear end portion of the detection rod 66. The core 72 is a metal member constituting the sensing device of the present invention. A relative position of the core 72 with respect to the detection coil 71, more specifically, an insertion length of the core 72 into the detection coil 71 is varied by an axial movement of the detection rod 66, and impedance of the detection coil 71 is varied in accordance with the change in the insertion length of the core 72 into the detection coil 71. Thus, the detection coil 71 and the core 72 constitute the sensing device of the present invention.

As also shown in FIG. 4, the diameter of the hollow portion is further enlarged above the portion on which the magnetic shield 69 is arranged, and a spring bearing 73 is inserted into the coil bobbin 70 from the hollow portion of the larger diameter. The spring bearing 73 comprises a flat portion and a cylindrical portion protruding from a center of the flat portion. The cylindrical portion is inserted into the coil bobbin 70 tightly from the rear end side (i.e., upper side in FIG. 4) of the coil bobbin 70, and the flat portion is fixed with the body 61 by a screw 74 penetrating the flat portion.

A compression spring 75 is interposed between the spring bearing 73 and the diametrically large rear end portion of the detection rod 66. The compression spring 75 corresponds to the elastic member of the present invention, and the compression spring 75 is adapted to push the detection rod 66 onto the object to be detected. Therefore, the detection rod 66 and the core 72 integrated with the detection rod 66 are moved linearly in accordance with the movement of the object.

A substrate 78 comprising a circuit 76 and an output terminal 77 is fitted into a rear opening of the body 61, and fixed by a resin mold 79 to close the opening. The circuit 76 is adapted to apply a constant current of a predetermined frequency and amplitude to the detection coil 71, and to detect a voltage at both ends of the detection coil 71 thereby outputting a detection signal. For example, the aforementioned circuit disclosed in Japanese Patent Laid-Open No. 2003-83764 can be used as the circuit 76.

Next, an action of the displacement sensing device shown in FIG. 4 will be explained hereinafter. In the example shown in FIG. 4, a trunnion 81 of a toroidal type continuously variable transmission 80 is an object to be detected, and the displacement sensing device is adapted to detect a displacement of the trunnion 81. The trunnion 81 is reciprocated by an actuator (not shown) such as a hydraulic cylinder positioned on one of the end sides thereof, and rotated in connection with such reciprocation. A displacement sensing device of the present invention is arranged on the other end side opposite to the side in which the actuator is arranged. Specifically, the body 61 is inserted into an opening of a casing 82, and fixed to the casing 82 by a bolt (not shown) inserted into the installation hole 63.

In this situation, the leading end portion of the detection rod 66 is contacted with an end portion of the trunnion 81 while being pushed by an elastic force of the compression spring 75. Therefore, in case the trunnion 81 moves away from the displacement sensing device (i.e., downwardly in FIG. 4), the detection rod 61 is pushed by the compression spring 75 in the direction to follow the trunnion 81. To the contrary, in case the trunnion 81 moves upwardly in FIG. 4, the detection rod is pushed upwardly by the trunnion 81 while compressing the compression spring 75. That is, the detection rod 66 is reciprocated integrally with the trunnion 81 in the axial direction thereof. Thus, the detection rod 66 can be integrated with the trunnion 81 as the object in a detecting direction by fixing the body 61 with the casing 82. Therefore, the displacement sensing device of the present invention can be installed easily.

As described, the core 72 integrated with the detection rod 66, therefore, when the trunnion 81 moves as explained, an insertion length of the core 72 into the detection coil 71 is varied, and the impedance of the detection coil 71 is changed in accordance with the change in the insertion length of the core 72. As also described, the constant current of a predetermined frequency and amplitude is applied to the detection coil 71. Therefore, the voltage at both ends of the detection coil 71 is varied in accordance with a change in the impedance thereof, and such change in the voltage is outputted as a detection signal from the output terminal 77. That is, a linear distance and a velocity of a displacement of the trunnion 81 are detected electrically.

The trunnion 81 is rotated as a result of the linear displacement thereof, and may be displaced by a stress resulting from a torque transmission. That is, the trunnion 81 moves three-dimensionally while rotating. On the other hand, the leading end portion of the detection rod 66 can be moved relatively with respect to the trunnion 81 along a face of the trunnion 81 perpendicular to the axial direction of the detection rod 66. Therefore, the detection rod 66 will not be displaced even if the trunnion 81 slides in the direction perpendicular to the axial direction of the detection rod 66. That is, the detection rod 66 moves only in the axial direction thereof in accordance with the displacement of the trunnion 81. Thus, the detection rod 66 will not be displaced by a displacement and a load in a direction different from the axial direction thereof. For this reason, the linear displacement of the trunnion 81 can be detected accurately.

As widely known, the toroidal type continuously variable transmission is adapted to transmit a torque between a pair of discs through a power roller interposed between the discs, and the torque is transmitted between the power roller and the disc through a film of traction oil. Therefore, the oil and so on are may be flying in the casing 82. However, the body 61 accommodating the rear end side of the detection rod 66 and the sensing device is covered entirely by the cover member 68, so that the body 61 is shielded from the trunnion 81 as the object to be detected and separated from an inner space of the casing 82. Thus, the displacement sensing device of the present invention is prevented from entrance of a foreign matter such as the oil. For this reason, the linear movement of the detection rod 66 and the core 72 will not be disturbed, and a sensitivity of the sensing device will not be degraded.

Lastly, the present invention should not be limited to the examples as thus far explained. Specifically, a capacitance sensor and an optical sensor can be used to detect the displacement instead of the impedance type sensor. The sensor may also be adapted to detect the displacement while converting the linear movement into a turning movement using an appropriate link or the like thereby detecting a turning angle. Contrary to above, the sensor may also be adapted to detect the displacement while converting a turning movement into the linear movement using an appropriate link or the like thereby detecting an angle based on the linear movement. The object to be detected should not be limited to the trunnion. That is, the sensing device of the present invention can also be applied to a member rotating and reciprocating at higher speed. In this case, it is preferable to attach the metal member or the core to the reciprocating member, and to fix the detection coil, thereby reducing inertia force to improve responsiveness at higher speed. As a result, accuracy of the detection can be improved and deterioration in durability of the sensing device can be avoided.

The invention claimed is:

1. A displacement sensing device for sensing a rotational angle of a rotation of a moving member and a distance of a linear movement of the moving member, or sensing an angular velocity of the rotation of the moving member and a velocity of the linear movement of the moving member, comprising:
    a first movable member, which is movable together with the moving member in a direction of the linear movement by the moving member;
    a second movable member, which is directly engaged with the moving member to be rotatable together with the moving member by the rotation of the moving member, and which holds the first movable member so that the first movable member is rotatable together with the second movable member;
    a first sensor outputting a signal in accordance with the linear movement of the first movable member; and
    a second sensor outputting a signal in accordance with the rotation of the second movable member;
    a body including an opening, and accommodating the first and the second movable members therein; and
    a substrate which is connected electrically at least with one of the first and the second sensors, and which closes the opening.

2. The displacement sensing device as set forth in claim 1, wherein:
    the first movable member is engaged with the moving member so that the moving member transfers only a force in the direction of the linear movement to the first movable member; and
    the second movable member is engaged with the moving member so that the moving member transfers only a force in a direction of the rotation to the second movable member.

3. The displacement sensing device as set forth in claim 1, wherein:
    the second movable member is formed cylindrically and held in a casing in a rotatable manner; and
    the first movable member is held in the cylindrical second movable member in a manner to move linearly.

4. The displacement sensing device as set forth in claim 3, wherein:
    the second sensor is arranged in the casing; and
    the first sensor is arranged in the cylindrical second movable member.

5. The displacement sensing device as set forth in claim 1, wherein:
    at least one of the first and the second sensors includes
        a detection coil, and
        a metal member, which is arranged in close proximity to the detection coil in a manner to move relative to the detection coil to vary impedance of the detection coil; and
    said at least one of the first and the second sensors includes a detecting device for detecting the distance or velocity of the linear movement of the moving member, or the amount or the angular velocity of the rotation of the moving member, by an electric signal according to a change in the impedance.

6. The displacement sensing device as set forth in claim 1, wherein:
    the moving member includes a trunnion holding a power roller of a toroidal type continuously variable transmission, or a member integral with the trunnion.

7. The displacement sensing device as set forth in claim 6, wherein:
    the first movable member is pushed onto the trunnion or the member integral with the trunnion by elastic force acting in the direction of the linear movement.

8. The displacement sensing device as set forth in claim 6, wherein:
    the second movable member is pushed onto the trunnion or the member integral with the trunnion by elastic force acting in a direction of the rotation.

9. The displacement sensing device as set forth in claim 1, wherein:
    the first movable member is contacted with a face of the moving member perpendicular to the direction of the linear movement in a slidable manner.

10. The displacement sensing device as set forth in claim 1, wherein:
    the second movable member initiates rotation of the first movable member.

11. A displacement sensing device for sensing a rotational angle of a rotation of a moving member and a distance of a linear movement of the moving member, or sensing an angular velocity of the rotation of the moving member and a velocity of the linear movement of the moving member, comprising:
    a first movable member, which is moved together with the moving member by the linear movement of the moving member;
    a second movable member, which is held by the first movable member in a rotatable manner or which holds the first movable member in a rotatable manner, and which is rotated together with the moving member by the rotation of the moving member;
    a first sensor outputting a signal in accordance with the linear movement of the first movable member; and
    a second sensor outputting a signal in accordance with the rotation of the second movable member,
    at least one of the first and the second sensors including
        a detection coil, and
        a metal member, which is arranged in close proximity to the detection coil in a manner to move relative to the detection coil to vary impedance of the detection coil, and
    said at least one of the first and the second sensors including a detecting device for detecting the distance or velocity of the linear movement of the moving member, or the amount or the angular velocity of the rotation of the moving member, by an electric signal according to a change in the impedance.

* * * * *